US009643268B2

(12) United States Patent
Flehmig et al.

(10) Patent No.: US 9,643,268 B2
(45) Date of Patent: May 9, 2017

(54) DEVICE AND METHOD FOR PARTIAL DECOATING AND/OR MACHINING OF MATERIAL FROM A WORKPIECE

(71) Applicants: Thomas Flehmig, Ratingen (DE); Dieter Scheuvens, Oberhausen (DE); Lothar Hömig, Voerde (DE)

(72) Inventors: Thomas Flehmig, Ratingen (DE); Dieter Scheuvens, Oberhausen (DE); Lothar Hömig, Voerde (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 94 days.

(21) Appl. No.: 14/628,629

(22) Filed: Feb. 23, 2015

(65) Prior Publication Data
US 2015/0239053 A1   Aug. 27, 2015

(30) Foreign Application Priority Data

Feb. 24, 2014   (DE) ..................... 10 2014 102 363

(51) Int. Cl.
*B23D 1/26*       (2006.01)
*B23D 79/04*     (2006.01)
(Continued)

(52) U.S. Cl.
CPC .............. *B23D 79/04* (2013.01); *B23D 1/26* (2013.01); *B23D 5/02* (2013.01); *B23D 79/02* (2013.01);
(Continued)

(58) Field of Classification Search
CPC .......... B23D 1/26; B23D 79/02; B23D 79/04; B23D 79/10; Y10T 409/3042;
(Continued)

(56) References Cited

U.S. PATENT DOCUMENTS 2,257,182 A * 9/1941 McClay .............. G03D 15/043
                                                        15/93.1
2,264,278 A * 12/1941 Danforth ................ B44D 3/162
                                                        15/93.1
(Continued)

FOREIGN PATENT DOCUMENTS

CN      102371296 A    3/2012
CN      202952133      5/2013
(Continued)

OTHER PUBLICATIONS

English language abstract of DE102011050316 (A1).
(Continued)

*Primary Examiner* — Daniel Howell
(74) *Attorney, Agent, or Firm* — thyssenkrupp North America, Inc.

(57) ABSTRACT

The present invention relates to a device for partial decoating and/or machining removal of a steel sheet coated with a metal coating and/or provided with a parasitic layer, wherein the device has a machining tool in the form of a scraping roller and wherein the scraping roller comprises a cutting edge for scraping the metal coating and/or parasitic layer off the steel-sheet surface, and wherein furthermore the scraping roller is rotatable about a rotation axis perpendicular to a main plane of extent of the steel sheet, the scraping roller has a circumferential face which is concentric with the rotation axis and in which at least one circumferential groove is formed, the groove has two lateral groove boundary faces that originate from the groove bottom face, wherein at least one of the two groove boundary faces has the cutting edge and the device is configured such that during decoating and/or machining removal, the at least one cutting edge scrapes over the steel-sheet edge in a manner parallel to the main plane of extent of the steel sheet.

20 Claims, 2 Drawing Sheets

(51) Int. Cl.
  *B23D 79/02* (2006.01)
  *B23K 31/02* (2006.01)
  *B23D 5/02* (2006.01)
  *B23K 101/18* (2006.01)
  *B23K 101/34* (2006.01)

(52) U.S. Cl.
  CPC ........ *B23K 31/02* (2013.01); *B23K 2201/185* (2013.01); *B23K 2201/34* (2013.01); *Y10T 409/50082* (2015.01); *Y10T 409/50246* (2015.01)

(58) Field of Classification Search
  CPC . Y10T 409/304144; Y10T 409/304256; Y10T 409/501476; Y10T 409/50164; Y10T 409/502132; Y10T 409/50246
  USPC .......... 83/869; 409/139, 140, 297, 298, 301, 409/303; 29/81.05, 81.11
  IPC ................................ B23D 79/02, 79/04, 79/10
  See application file for complete search history.

(56) References Cited

U.S. PATENT DOCUMENTS

| | | | | |
|---|---|---|---|---|
| 2,381,807 | A * | 8/1945 | Davis | B23D 79/00 409/131 |
| 2,381,808 | A * | 8/1945 | Davis | B21D 19/005 409/131 |
| 3,075,216 | A * | 1/1963 | Wiener | A47L 13/08 15/93.1 |
| 3,170,373 | A * | 2/1965 | Crepeau | B23C 3/13 409/182 |
| 3,377,896 | A * | 4/1968 | De Corta | B23D 1/26 409/138 |
| 3,614,375 | A | 10/1971 | Becker | |
| 3,629,544 | A | 12/1971 | Becker | |
| 3,643,057 | A | 2/1972 | Becker | |
| 3,778,583 | A | 12/1973 | Becker | |
| 3,798,406 | A | 3/1974 | Becker | |
| 3,798,407 | A | 3/1974 | Becker | |
| 3,800,118 | A | 3/1974 | Becker | |
| 3,805,013 | A | 4/1974 | Becker | |
| 3,897,593 | A | 7/1975 | Becker | |
| 3,947,614 | A | 3/1976 | Becker | |
| 3,988,562 | A | 10/1976 | Becker | |
| 3,989,919 | A | 11/1976 | Becker | |
| 4,009,362 | A | 2/1977 | Becker | |
| 4,027,378 | A * | 6/1977 | Wennberg | B23D 79/04 204/281 |
| 4,037,073 | A | 7/1977 | Becker | |
| 4,117,296 | A | 9/1978 | Becker | |
| 4,155,798 | A | 5/1979 | Becker | |
| 4,685,845 | A * | 8/1987 | Emter | B23C 3/00 409/145 |
| 4,750,849 | A * | 6/1988 | Phillips | B23C 3/34 407/61 |
| 4,978,259 | A * | 12/1990 | Wollam | B23C 3/12 407/7 |
| 6,196,286 | B1 * | 3/2001 | Susnjara | B27D 5/006 144/134.1 |
| 6,319,104 | B1 * | 11/2001 | Emter | B23C 5/006 409/145 |
| 6,773,204 | B1 * | 8/2004 | Emter | B23C 3/00 409/139 |

FOREIGN PATENT DOCUMENTS

| | | | | |
|---|---|---|---|---|
| CN | 203018807 U | | 6/2013 | |
| DE | 15 65 450 | | 8/1970 | |
| DE | 2758014 A1 | * | 7/1979 | ............. B23D 1/26 |
| DE | 3116946 A1 | * | 12/1982 | ............. B23D 79/02 |
| DE | 102006050702 A1 | | 4/2008 | |
| DE | 102011050316 A1 | | 1/2013 | |
| GB | 2154159 A | * | 9/1985 | ............. B23P 13/02 |

OTHER PUBLICATIONS

English language abstract of DE102006050702 (A1).
English language Abstract for CN 102371296 A.
English language Abstract for CN 203018807 U.
English language Abstract for CN 202952133 U.

* cited by examiner

DEVICE AND METHOD FOR PARTIAL DECOATING AND/OR MACHINING OF MATERIAL FROM A WORKPIECE

FIELD

This disclosure relates to a device and method for partial decoating and or machining of material from a workpiece, such as a sheet metal workpiece.

BACKGROUND

Often times after steel sheets are hot formed to create a semifinished product they are also then subjected to a hardening process. The hardening process may cause surface damage and/or corrosion to occur in the sheet metal. To prevent such surface damage and corrosion from occurring in hot formed steel sheets when they are subjected to a hardening process, prior to the hot forming step the steel sheets may have a protective layer applied thereto, or created therein. A common method is the coating of the steel sheets with an anti-corrosion coating (metal coating), such as an aluminum-silicon alloy (AlSi), for example, in the context of hot-dipping of steel strips.

However, during the welding of such coated steel sheets, aluminum inclusions can occur in the weld seam, with the undesirable result that the strength of the welded connection is decreased or compromised. It is therefore necessary, after the hardening process, to remove the metal coating from those regions of the steel sheet in which a welded connection is to be made. In particular the edges of the steel sheets usually represent the regions to be decoated. However, edge preparation may be necessary not only in the case of coated steel sheets, but also in the case of uncoated steel sheets that are intended to be fed to a welding process, and may be, for example, coated in oil or other surface contamination and/or in an already slightly corroded state.

In order to remove the metal coating from the steel sheet, the document DE 10 2011 050 316 A1 proposes a method in which the steel-sheet blank is placed on a blank support of a press and during a closing movement of the press, scraping knives are moved transversely to a main direction of extent of the regions to be decoated of the blank in order to scrape off the coating of the blank in these regions. The regions of the blank to be decoated usually comprise the edge regions of the blank. The scraping knives are pushed into the layer during the closure of the press and subsequently pulled out or moved as far as the edge perpendicular to the edge profile. Depending on the steel-sheet contour, the edge regions can also have relatively complex profiles with comparatively small curve radii. On account of the unfavorable angular position, it is disadvantageously not possible to decoat such steel-sheet contours having highly curved edges using the proposed method. Furthermore, in the proposed solution, there is the problem that it is comparatively difficult to set the scraping knives exactly over a relatively great length.

A further solution for removing the metal coating from only one side of the steel sheet can be found in the document DE 10 2006 050 702 A1, in which provision is made of a machining tool of the plane type or rotating grinding head type which acts areally on the surface of one side of the steel strip in order to effect mechanical stripping of the metal coating there. A disadvantage with this solution is that only one side of the metal coating is stripped off. Furthermore, this solution is configured to achieve areal stripping of the metal coating from the entire surface of the one side of the steel sheet, with the result that the precise positioning, necessary for partial decoating, of the machining tool relative to the steel sheet is realizable only in a comparatively complicated manner.

BRIEF DESCRIPTION OF THE DRAWINGS

The present invention is described in detail below with reference to the attached drawing figures, wherein.

DETAILED DESCRIPTION

Figure 1:
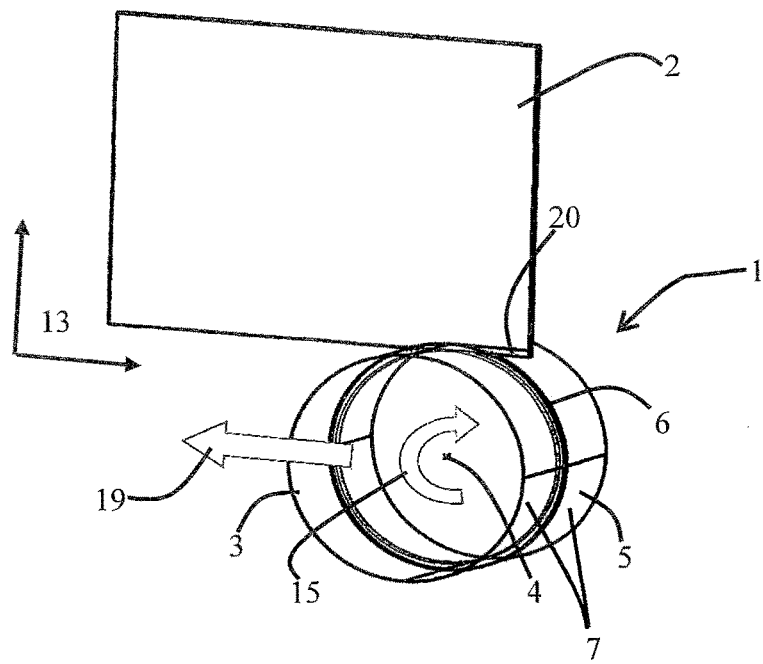
FIG. 1 is a schematic perspective view of a first embodiment of a device of the present disclosure.

It is the object of the present invention to provide a device and a method for partial machining removal and/or decoating of a workpiece, said device and method not only ensuring reliable removal of the metal coating and/or machining removal of a parasitic layer even in the case of workpieces having curved edges, but also being realizable in an automatable and cost-effective manner. In addition, rapid decoating and/or machining removal is intended to be enabled, in order to achieve cycle rates that are as high as possible in the manufacturing process.

This object is achieved by a device for partial machining removal and/or decoating of a steel sheet coated with a metal coating or provided with a parasitic layer, wherein the device has a machining tool in the form of a scraping roller and wherein the scraping roller comprises a cutting edge for scraping the metal coating and/or parasitic layer off the steel-sheet surface, and wherein furthermore the scraping roller is rotatable about a rotation axis perpendicular to a main plane of extent of the steel sheet, the scraping roller has a circumferential face which is concentric with the rotation axis and in which at least one circumferential groove is formed, the groove has two lateral groove boundary faces that originate from the groove bottom face, wherein at least one of the two groove boundary faces has the cutting edge and the device is configured such that during decoating and/or machining removal, the at least one cutting edge scrapes over the steel-sheet edge in a manner parallel to the main plane of extent of the steel sheet.

Compared with the prior art, the device according to the invention has the advantage that the scraping roller can be moved easily along the contour of a steel-sheet edge, with the result that quick, and also easily and cost-effectively implementable partial decoating and/or machining removal can be realized in the edge region of the steel sheet. In contrast to the prior art, the device according to the invention can also be used to decoat and/or machine (i.e. remove material from) contour profiles that have tight curves with small radii. As a result of the mechanical stripping of the metal coating and/or parasitic layer by means of the cutting edge, reliable removal of the coating and/or parasitic layer is additionally achieved. By doing so, the steel sheet may be joined, at that decoated and/or machined removal region, to another workpiece, by a welded connection, which welded connection has a high load-bearing strength in subsequent manufacturing processes. In one embodiment, the metal coating and/or parasitic layer to be partially removed may comprise at least one of an aluminum-silicon alloy (AlSi), a zinc-iron alloy, an oil layer, or a corroded layer. A metal coating can be applied to the steel sheet, for example, in a hot-dip process prior to the hardening of the steel sheet. The steel sheet to be partially decoated can be in particular a high-strength steel to be hardened. The device preferably has a receptacle in which the steel sheet that is to be partially decoated and/or machined is received. It is conceivable for the receptacle to comprise a fixing device in order to fix the steel sheet in the receptacle such that those regions of the steel sheet that are intended to be decoated and/or machined, in particular the steel-sheet edges, are exposed. The scraping roller is preferably fastened in a rotatable manner to a mounting bracket. The mounting bracket of the scraping roller is preferably moved by way of a drive device relative to the receptacle equipped with the steel sheet. However, it would alternatively also be conceivable for the receptacle equipped with the steel sheet to be moved by the drive device relative to the mounting bracket of the scraping roller. Preferably, a defined region, adjoining the end face, of the steel-sheet edge is thus mechanically freed of the coating and/or parasitic layer and is available for a subsequent welded connection. The depth of the groove determines the size of the region to be decoated and/or machined removal.

Advantageous configurations and developments of the invention can be gathered from the dependent claims, and from the description with reference to the drawings.

According to one embodiment of the present invention, provision is made for the scraping roller to be formed either in one piece, in that the groove is milled into the material of the scraping roller, or in a multipart manner. In the multipart configuration, the scraping roller has at least two roller elements which are spaced apart by a spacer in order to form the groove. The spacer can either be a spacer disc having a defined thickness parallel to the rotation axis or is configured to be adjustable, in particular mechanically, electrically, hydraulically or pneumatically, in terms of its thickness parallel to the rotation axis. The adjustable configuration has the advantage that the clear width of the groove is adaptable in a variable manner to the desired steel-sheet thickness.

According to a preferred embodiment of the present invention, provision is made for the groove to have a groove bottom face that is concentric with the rotation axis, and for the device to be configured such that during decoating and/or machining material removal, the steel sheet projects into the groove with one steel-sheet edge and the scraping roller runs with the groove bottom face on an end side of the steel-sheet edge, in particular in a slip-free manner with respect to the sheet edge. Advantageously, the scraping roller is thus guided automatically along the steel-sheet edge such that precise positioning of the scraping roller relative to the steel sheet is always ensured. In addition, comparatively rapid decoating and/or machining removal is enabled as a result, since the scraping roller can be guided and moved in a correspondingly rapid manner along the steel sheet.

According to a preferred embodiment of the present invention, provision is made for the decoating/stripping width to be settable, for example mechanically, electrically, hydraulically or pneumatically, via the penetration depth of the scraping roller, in order to adapt the size of the decoated and/or machined removal region in a variable manner. Alternatively, depending on the requirements, it is conceivable for a corresponding spacer disc having a defined diameter to be used for achieving the desired penetration depth. The cutting edge is either formed directly in the transition region between the circumferential face and the lateral groove boundary face, or in the groove boundary face at any desired spacing from the circumferential face. The groove boundary face extends in a radial direction from the rotation axis or is formed at an angle to the radial direction. The groove boundary face acts in particular as a machined clearance surface, while the circumferential face acts as a cutting face.

According to a preferred embodiment of the present invention, provision is made for each of the two groove boundary faces to have a cutting edge, and for the device to be configured such that during decoating and/or machining removal, on both sides of the steel sheet, one of the two cutting edges scrapes over the steel-sheet edge in a manner parallel to the main plane of extent of the steel sheet. Advantageously, both sides of the steel sheet are decoated and/or machined removal at the same time and in a single working step here.

According to a preferred embodiment of the present invention, provision is made for a shoulder for burr removal to be formed between the cutting edge and the circumferential face. The shoulder advantageously serves to remove the coating/stripping remnants scraped off the steel sheet from the decoated and/or machined removal region and in particular from the groove. Advantageously, no additional working step is required for this purpose. Alternatively or in addition, provision is preferably made for the device to have a burr-removal device trailing the scraping roller. This burr-removal device is preferably coupled to the scraping roller, and particularly preferably to the mounting bracket of the scraping roller, such that the burr-removal device is moved with the scraping roller along the contour of the steel sheet and as a result the coating remnants scraped off the steel sheet are removed from the steel sheet. The burr-removal device comprises in particular inclined knives, brushes, further rollers or the like.

According to a preferred embodiment of the present invention, provision is made for the scraping roller to have a burr-removal groove that is offset with respect to the groove in a manner parallel to the rotation axis, the clear width of said burr-removal groove parallel to the rotation axis being greater than that of the groove. Following decoating and/or machining removal of the steel sheet, the scraping roller can be moved along the contour of the steel sheet again, wherein the edge of the steel sheet is not then guided through the groove again but rather through the wider burr-removal groove. In this way, only the coating/stripping remnants scraped off the steel sheet are removed from the steel sheet.

According to a preferred embodiment of the present invention, provision is made for the scraping roller to have a plurality of grooves and/or burr-removal grooves which are offset with respect to one another in a manner parallel to the rotation axis and are intended for different steel-sheet thicknesses. Advantageously, the scraping roller thus acts as a type of combination tool which is usable for different steel-sheet thicknesses. To this end, the grooves and/or burr-removal grooves have different clear widths. Depending on the steel-sheet thickness, use is then made of that groove or burr-removal groove which is provided for the current steel-sheet thickness. In order to change between different grooves or burr-removal grooves, the scraping roller merely has to be displaced along the rotation axis. It is conceivable for this displacement movement to be initiated or controlled automatically.

A further subject of the present invention is a method for partial decoating and/or machining removal of a steel sheet coated with a metal coating and/or provided with a parasitic layer, in particular using the device according to the invention, wherein the steel sheet is provided in a first method step, wherein a machining tool in the form of a scraping roller is moved along a contour of the steel sheet in a second method step and the metal coating and/or parasitic layer is scraped off the steel-sheet surface by way of a cutting edge of the scraping roller, characterized in that the scraping roller is rotated about a rotation axis perpendicular to a main plane of extent of the steel sheet in the second method step. The advantageous method, analogously to the above-described device according to the invention, allows quick, and also easily and cost-effectively implementable partial decoating and/or machining removal in the edge region of the steel sheet. Here, in particular a steel-sheet edge of the steel sheet is moved through a groove in the scraping roller, said groove being formed in a circumferential face of the scraping roller, said circumferential face being concentric with the rotation axis. In this way, positive guidance of the scraping roller relative to the steel sheet is realized, and so precise positioning of the scraping roller relative to the steel sheet is advantageously always ensured.

According to a preferred embodiment of the present invention, provision is made for the scraping roller to be moved relative to the steel sheet in the second method step, such that the scraping roller runs on an end side of the steel-sheet edge, in particular in a slip-free manner with respect to the sheet edge, with a groove bottom face of the groove, said groove bottom face being concentric with the rotation axis. The scraping roller is preferably not driven but has a freewheel such that the rotation of the scraping roller is set automatically by the linear relative movement between the scraping roller and steel sheet along the steel-sheet contour. Alternatively, however, it would also be conceivable for the scraping roller to be driven in rotation, wherein, in this case, the rotational movement of the scraping roller about the rotation axis is preferably coordinated with the linear movement between the scraping roller and steel sheet such that no slip with respect to the sheet edge occurs. In other words: synchronism is realized between the steel sheet and scraping roller.

According to a preferred embodiment of the present invention, provision is made for the scraping roller to be moved relative to the steel sheet in the second method step, such that a cutting edge, which is formed on a lateral groove boundary face originating from the groove bottom face, scrapes over the steel-sheet edge in a manner parallel to the main plane of extent of the steel sheet, and such that, preferably on both sides of the steel sheet, a cutting edge scrapes over the steel-sheet edge in a manner parallel to the main plane of extent of the steel sheet. Advantageously, the steel-sheet edge can thus be decoated and/or machined removal on one side or on two sides.

According to a preferred embodiment of the present invention, provision is made for the groove to be formed between two roller elements of the scraping roller and for the spacing between the two roller elements parallel to the rotation axis to be set, in particular mechanically, electrically, hydraulically or pneumatically, by way of a spacer. In this embodiment, stepless adjustment of the groove width is advantageously possible, with the result that the device is flexibly adaptable to any desired steel-sheet thicknesses.

According to a preferred embodiment of the present invention, provision is made for scraped-off burrs to be removed in the second method step by a burr-removal device trailing the scraping roller, and/or by a shoulder for burr removal that is formed between the cutting edge and a circumferential face of the scraping roller, and/or for the steel-sheet edge to be moved in a third method step through a burr-removal groove that is offset with respect to the groove in a parallel manner along the rotation axis, said burr-removal groove being formed in a circumferential face of the scraping roller, said circumferential face being concentric with the rotation axis. Advantageously, the coating remnants scraped off the steel sheet are thus removed from the decoated region and/or stripping remnants are removed from the machined removal region, and in particular from the steel sheet.

Further details, features and advantages of the invention can be gathered from the drawings and from the following description of preferred embodiments with reference to the drawings. The drawings in this case illustrate merely exemplary embodiments of the invention which do not restrict the essential concept of the invention.

In the various figures, identical parts are always provided with the same reference signs and are therefore generally also each only referred to or mentioned once.

FIG. 1 illustrates a schematic perspective view of a device 1 for partial decoating of a steel sheet 2 coated with a metal coating, according to an exemplary first embodiment of the present invention. The device 1 comprises a scraping roller 3 which acts as a machining tool. The scraping roller 3 is formed in a substantially cylindrical manner and is mounted so as to be rotatable about a rotation axis 4. To this end, the scraping roller 3 is fastened in a rotatable manner to a mounting bracket (not illustrated). Furthermore, the scraping roller 3 has a circumferential face 5 which is concentric with the rotation axis 4 and in which a circumferential groove 6 is formed. The groove 6 comprises a groove bottom face 10, which is concentric with the rotation axis 4, and two opposite lateral groove boundary faces 11 which extend on both sides of the groove 6 from the groove bottom face 10 to the circumferential face 5 and act as a wall of the groove 6. The groove 6 furthermore has two opposite cutting edges 12 which are each formed in the transition region between the circumferential face 5 and the lateral groove boundary faces 11.

It is conceivable for the scraping roller 3 to be formed in one part and for the groove 6 to have been milled into the circumferential face 5. Preferably, however, the scraping roller 3 comprises at least two separate roller elements 7 which are spaced apart from one another along the rotation axis 4 by a spacer 8, such that the groove 6 is formed between the roller elements 7. The spacer 8 is preferably a spacer disc 9 having a defined thickness along the rotation axis 4, said thickness determining the clear width of the groove 6, and having a defined diameter perpendicular to the rotation axis 4, said diameter determining the depth of the groove 6. As a result of the choice of a corresponding spacer disc 9, the groove 6 can thus be set to a desired steel-sheet thickness and/or to a desired region to be decoated. The spacer disc 9 is therefore in particular exchangeable. Alternatively, it would also be conceivable for the spacer 8 to be adjustable, for example mechanically, electrically, hydraulically or pneumatically, in terms of its thickness and/or in terms of its diameter, with the result that the clear width and/or the depth of the groove 6 is settable in a variable manner. This can be particularly advantageous in particular for bridging weld seams in the case of tailored blanks.

The cutting edges 12 are configured to decoat both sides of a steel sheet 2 coated with a metal coating in the form of an aluminum-silicon alloy (AlSi), in that the coating is scraped off the steel sheet 2 by the cutting edges 12. For this purpose, a steel-sheet edge of the steel sheet 2 is introduced into the groove 6 and the scraping roller 3 rotates about the rotation axis 4 perpendicular to the main plane of extent 13 of the steel sheet 2 (see rotation arrow 15). The scraping roller 3 runs in this case with the groove bottom face 10 on the end face of the steel-sheet edge in a slip-free manner, such that the mounting bracket of the scraping roller 3, or the rotation axis 4, is moved along the contour of the steel-sheet edge relative to the steel sheet 2. Either the scraping roller 3 is not driven but rather operated with a freewheel or the rotary speed of the scraping roller 3 is coordinated with the relative movement between the mounting bracket and steel sheet 2, such that no slip occurs between the groove bottom face 10 and the end side of the steel-sheet edge.

The clear width of the groove 6 is selected such that it corresponds substantially to the steel-sheet thickness without a metal coating, i.e. the clear width of the groove 6 is less than the thickness of the steel sheet 2 coated on both sides with the coating to be removed. During rolling of the scraping roller 3, the coating is therefore scraped off both sides of the steel sheet 2 by the cutting edges 12. The coating is in this case pushed by the cutting edge 12 parallel to the main plane of extent 13 from the end side in the direction of the steel-sheet center. Thus, a decoated region 20 is produced on both sides at the steel-sheet edge, the size of said region 20 being predetermined in each case by the depth of the groove 6. In this decoated region, weld seams can be produced in subsequent machining or manufacturing steps of the steel sheet, there being no fear at said weld seams of contamination on account of the coating elements and negative influences, for example losses of strength, associated therewith. As a result of the scraping roller 3 running on the end side of the steel sheet 2, the scraping roller 3 substantially automatically follows the contour of the steel sheet 2, and so the device 1 can be automated relatively easily. It is also conceivable for the scraping roller 3 to travel around and decoat the entire contour of the steel sheet 2 or for only selectively determined edge regions to be decoated.

The steel sheet 2, which comprises in particular a blank, is preferably fixed in a steel-sheet receptacle (not illustrated) and secured against slipping for example by clamps. The scraping roller 3 is then placed exactly centrally against one end of the steel sheet 2. The mounting bracket of the scraping roller 3 is then moved relative to the fixed steel sheet 2 by a drive device (not illustrated) along the steel-sheet contour (see movement arrow 19) and thus the contour of the steel sheet 2 is traveled along. In principle, however, it would of course alternatively also be conceivable for the steel-sheet receptacle to be moved relative to the scraping roller 3. In the case of a curved contour of the steel sheet 2, a movement of the mounting bracket is easier to realize, however.

Figure 2:
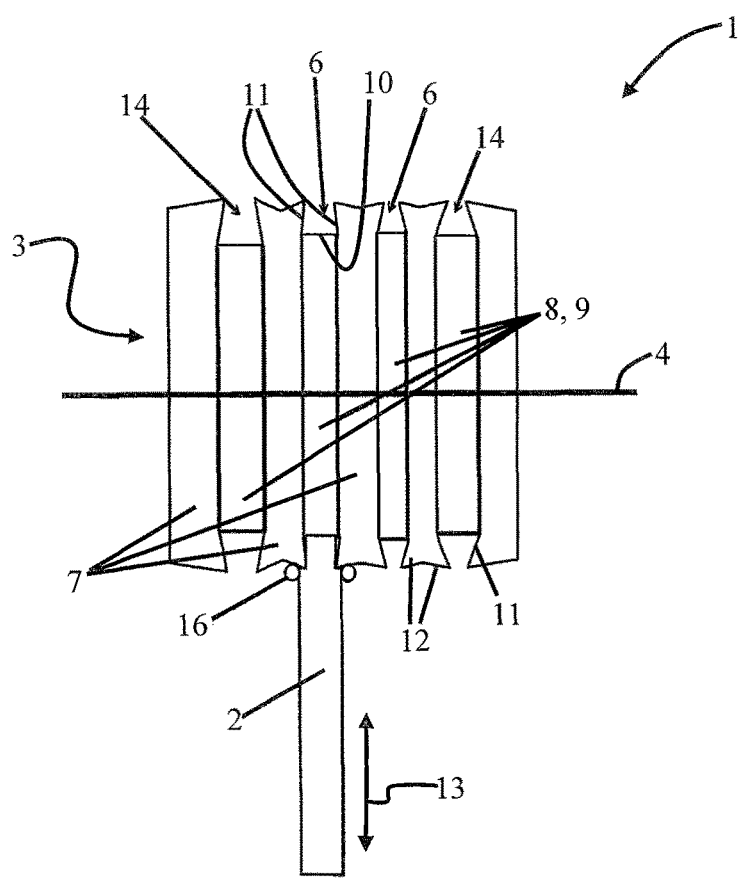
FIG. 2 is a schematic sectional view of a second embodiment of a device of the present disclosure.

FIG. 2 illustrates a schematic sectional view of a device 1 according to an exemplary second embodiment of the present invention. The device 1 according to the second embodiment corresponds substantially to the device 1, described with reference to FIG. 1, according to the first embodiment, wherein, by contrast, the scraping roller 3 in the device 1 according to the second embodiment does not have just a single groove 6 but rather two grooves 6. The two grooves 6 are offset with respect to one another along the rotation axis 4 and have different clear widths parallel to the rotation axis 4. In this way, the scraping roller 3 can be used for steel sheets 2 having different material thicknesses. The steel sheet 2 to be decoated merely has to be machined with the appropriate groove 6 corresponding to the thickness of the steel sheet 2. In the present example, the steel-sheet edge is arranged for example in the wider groove 6. The sectional illustration shown in FIG. 2 furthermore reveals that the lateral groove boundary faces 11 do not extend radially to the rotation axis 4 but are arranged at such an angle that they run towards one another in the form of a cone portion with increasing distance from the rotation axis. The cutting edges 12 thus project in the direction of the steel-sheet surface, with the result that self-centering of the steel sheet 2 within the groove 2 is achieved (since in the central position a low force requirement is necessary).

The scraping roller 3 of the device 1 according to the second embodiment additionally has, for each of the grooves 6, an appropriate burr-removal groove 14. During decoating of the steel-sheet edges, the coating is pushed away from the steel-sheet edge in the direction of the steel-sheet middle by the cutting edges 12. The coating remnants 16 initially remain in a rolled-up manner or in the form of shavings next to the decoated region. In order to remove these coating remnants, the scraping roller 3 is guided over the already decoated steel-sheet edge again in a subsequent burr removal step, wherein the steel-sheet edge is in this case guided through the burr-removal groove 14, the width and depth of which are greater than those of the groove 6 for decoating, and thus the coating remnants 16 are stripped off the steel sheet 2.

Figure 3:
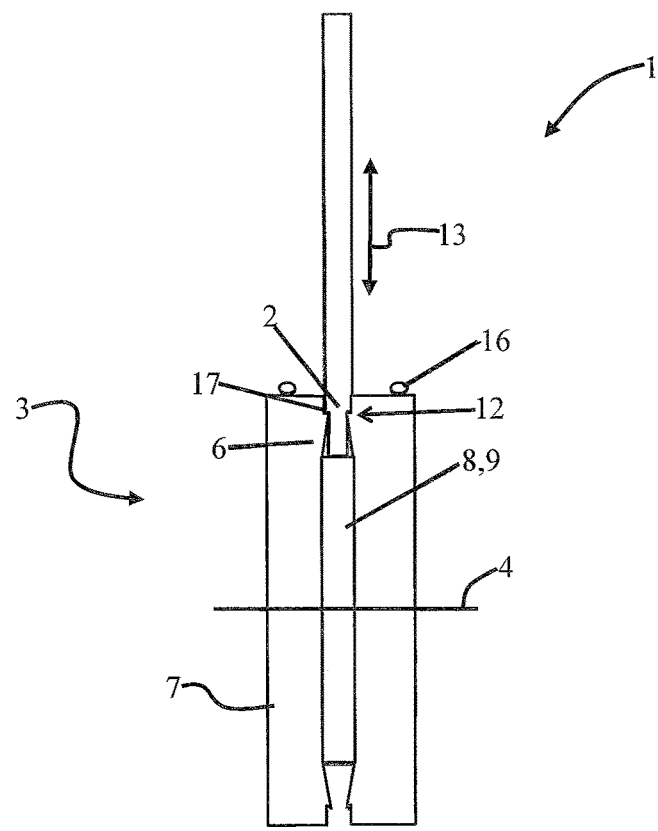
FIG. 3 is a schematic sectional view of a third embodiment of a device of the present disclosure.

FIG. 3 illustrates a schematic sectional view of a device 1 according to an exemplary third embodiment of the present invention. The device 1 according to third embodiment again corresponds substantially to the device 1, described with reference to FIG. 1, according to the first embodiment, wherein, by contrast, in the case of the device 1 according to the third embodiment, the lateral groove boundary faces 11 in the groove 6 of the scraping roller 3 not only have the cutting edges 12 but also comprise a shoulder 17 for burr removal. The cutting edge 12 is, to this end, offset in the direction of the rotation axis 4 at the groove boundary face 11. The shoulder 17 is then formed in each case between the cutting edge 12 and the circumferential face 6 and ensures that the coating remnants 16 are removed directly following the decoating of the steel-sheet edge. Advantageously, no re-machining of the steel-sheet edge in order to remove the coating remnants 16 in an additional step is required in this solution.

Figure 4:
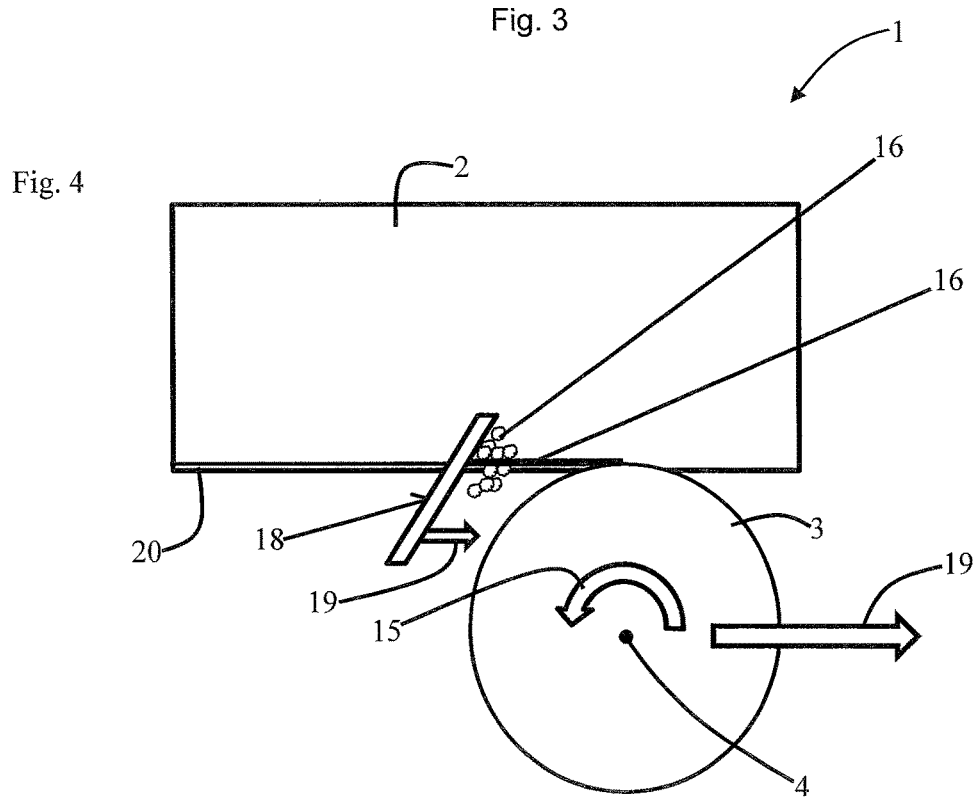
FIG. 4 is a schematic sectional view of a fourth embodiment of a device of the present disclosure.

FIG. 4 shows a schematic sectional view of a device 1 according to an exemplary fourth embodiment of the present invention, which is likewise substantially similar to the device 1, described with reference to FIG. 1, according to the first embodiment, wherein, by contrast, the device 1 has a burr-removal device 18 which is connected downstream of the scraping roller 3. In the present example, the burr-removal device 18 comprises a deburring knife for scraping off the coating remnants 16, said deburring knife being coupled to the mounting bracket of the scraping roller 3 such that the deburring knife runs along the steel-sheet contour behind the scraping roller 3 (see movement arrow 19) and thus immediately removes from the steel sheet 2 the coating remnants 16 displaced by the scraping roller 3. Advantageously, no re-machining of the steel-sheet edge for removing the coating remnants 16 in an additional step is required in this solution either.

FIGS. 1 to 4 each show only one device 1, or one scraping roller 3, on a mounting bracket (not illustrated). In order to increase the cycle times, it is also possible to use two devices (not illustrated) which allow for example simultaneous, two-sided decoating of the sheet edges, wherein the devices, or scraping rollers, decoat the opposite sheet edges in the same direction or opposite directions.

Defects in the form of corrosion layers and/or oil layers in the edge region of uncoated steel sheets can also be machined removal in a cost-effective manner in accordance with the method and device according to the invention. As a result, negative influences of parasitic elements on the edge surface are substantially reduced during the edge preparation according to the invention for the welding process.

What is claimed is:

1. A device for partial decoating and/or machining removal of a steel sheet coated with a metal coating and/or provided with a parasitic layer, the device comprising a machining tool in the form of a scraping roller, wherein the scraping roller comprises cutting edges configured to scrape the metal coating and/or parasitic layer off surfaces of the steel sheet, wherein the scraping roller is rotatable about a rotation axis that is perpendicular to a main surface plane of the steel sheet, wherein the scraping roller comprises a circumferential face that is concentric with the rotation axis and in which at least one circumferential groove is formed, wherein the at least one circumferential groove includes two lateral groove boundary faces that originate from a groove bottom face, wherein each of the two lateral groove boundary faces includes one of the cutting edges, wherein during decoating and/or machining removal the cutting edges are configured over a steel-sheet edge in a manner parallel to the main surface plane of the steel sheet for scraping both sides of the steel sheet.

2. The device of claim 1, wherein the scraping roller is formed in one piece or has at least two separate roller elements that are spaced apart by a spacer in order to form the at least one circumferential groove.

3. The device of claim 2, wherein the spacer comprises a spacer disc having a defined thickness parallel to the rotation axis, or wherein the spacer is configured to be adjustable mechanically, electrically, hydraulically or pneumatically in terms of its thickness parallel to the rotation axis.

4. The device of claim 1, wherein the groove bottom face is concentric with the rotation axis, and the device is configured such that during decoating and/or machining removal, the steel-sheet edge of the steel sheet projects into the at least one circumferential groove and the scraping roller runs with the groove bottom face on an end side of the steel-sheet edge.

5. The device of claim 1 further comprising a shoulder burr removal disposed between at least one of the cutting edges and the circumferential face.

6. The device of claim 1, wherein at least one of
the scraping roller has a burr-removal groove that is offset with respect to the at least one circumferential groove in a manner parallel to the rotation axis, a clear width of said burr-removal groove parallel to the rotation axis being greater than that of the at least one circumferential groove, or
the device has a burr-removal device trailing the scraping roller.

7. The device of claim 1, wherein the scraping roller has a plurality of grooves and/or burr-removal grooves which are offset with respect to one another in a manner parallel to the rotation axis and are intended for different steel-sheet thicknesses.

8. A method for the partial decoating and/or machining of a steel sheet coated with a metal coating and/or provided with a parasitic layer, the method comprising:
receiving the steel sheet to be at least partially decoated and/or machined;
moving a scraping roller along a contour of the steel sheet;
scraping at least one of the metal coating or parasitic layer off both sides of the steel sheet with cutting edges of the scraping roller; and
while scraping, rotating the scraping roller about a rotation axis perpendicular to a main plane of extent of the steel sheet.

9. The method of claim 8, wherein a steel-sheet edge of the steel sheet is moved through a groove in the scraping roller, said groove being formed in a circumferential face of the scraping roller, said circumferential face being concentric with the rotation axis.

10. The method of claim 9, wherein the scraping roller is moved relative to the steel sheet such that a groove bottom face of the groove of the scraping roller runs on an end side of the steel-sheet edge, said groove bottom face being concentric with the rotation axis.

11. The method of claim 10, wherein the scraping roller is moved relative to the steel sheet such that the cutting edges, which are formed on a lateral groove boundary faces originating from the groove bottom face, scrape over the steel-sheet edge in a manner parallel to the main plane of extent of the steel sheet.

12. The method of claim 9, wherein the groove is formed between two roller elements of the scraping roller and spacing between the two roller elements parallel to the rotation axis is set by way of a spacer.

13. The method of claim 9, wherein at least one of
scraped-off coating remnants are removed by a burr-removal device trailing the scraping roller and/or by a shoulder for burr removal that is formed between at least one of the cutting edges and the circumferential face of the scraping roller, or
the steel-sheet edge is moved through a burr-removal groove that is offset with respect to the groove in a parallel manner along the rotation axis, said burr-removal groove being formed in the circumferential face of the scraping roller.

14. The device of claim 1 configured such that during decoating and/or machining removal the steel-sheet edge of the steel sheet projects into the at least one circumferential groove and the scraping roller runs with the groove bottom face on an end side of the steel-sheet edge in a slip-free manner with respect to the steel-sheet edge.

15. The method of claim 9 wherein moving the scraping roller along the contour of the steel sheet comprises moving the scraping roller relative to the steel sheet such that a groove bottom face of the groove of the scraping roller runs on an end side of the steel-sheet edge in a slip-free manner with respect to the steel-sheet edge, said groove bottom face being concentric with the rotation axis.

16. The method of claim 9 wherein the groove is formed between two roller elements of the scraping roller, wherein spacing parallel to the rotation axis between the two roller elements is set mechanically, electrically, hydraulically, or pneumatically by way of a spacer.

17. The device of claim 1 further comprising a burr-removal device trailing the scraping roller, wherein the burr-removal device comprises a deburring knife.

18. The method of claim 10 wherein moving the scraping roller along the contour of the steel sheet comprises moving the scraping roller relative to the steel sheet such that the cutting edges formed on lateral groove boundary faces extending from the groove bottom face scrape over the steel-sheet edge in a manner parallel to the main plane of extent of the steel sheet.

19. The device of claim 1 wherein the cutting edges are angled towards one another and are closest to one another at the circumferential face.

20. A device for partial decoating and/or machining removal of a steel sheet coated with a metal coating and/or provided with a parasitic layer, the device comprising a scraping roller that comprises a cutting edge configured to scrape the metal coating and/or parasitic layer off a surface of the steel sheet, wherein the scraping roller is rotatable about a rotation axis that is perpendicular to a main surface plane of the steel sheet, wherein the scraping roller comprises a circumferential face that is concentric with the rotation axis and in which a circumferential groove is formed, wherein the circumferential groove includes two lateral groove boundary faces that originate from a groove bottom face, wherein the cutting edge is formed by an acute angle between the circumferential face and at least one of the two lateral groove boundary faces, wherein during decoating and/or machining removal the cutting edge is configured along a steel-sheet edge in a manner parallel to the main surface plane of the steel sheet for scraping a side of the steel sheet.

\* \* \* \* \*